US 7,885,274 B2

(12) United States Patent
Thubert

(10) Patent No.: US 7,885,274 B2
(45) Date of Patent: Feb. 8, 2011

(54) ROUTE OPTIMIZATION BETWEEN A MOBILE ROUTER AND A CORRESPONDENT NODE USING REVERSE ROUTABILITY NETWORK PREFIX OPTION

(75) Inventor: Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 1017 days.

(21) Appl. No.: 11/710,914

(22) Filed: Feb. 27, 2007

(65) Prior Publication Data
US 2008/0205313 A1 Aug. 28, 2008

(51) Int. Cl.
*H04L 12/28* (2006.01)
(52) U.S. Cl. ............... 370/401; 370/400; 370/465; 370/466; 370/338
(58) Field of Classification Search ........... 713/171; 370/475, 392, 401, 400, 338, 465, 466
See application file for complete search history.

(56) References Cited

U.S. PATENT DOCUMENTS

| 7,031,328 | B2 | 4/2006 | Thubert et al. |
| 7,177,646 | B2 | 2/2007 | O'Neill et al. |
| 7,493,652 | B2 * | 2/2009 | Aura ............................. 726/2 |
| 7,502,932 | B2 * | 3/2009 | Lee ............................ 713/171 |
| 2004/0202183 | A1 | 10/2004 | Thubert et al. |
| 2004/0228343 | A1 * | 11/2004 | Molteni et al. ............... 370/392 |
| 2005/0175002 | A1 * | 8/2005 | Le et al. ...................... 370/389 |
| 2006/0133337 | A1 * | 6/2006 | An et al. ...................... 370/338 |
| 2007/0113075 | A1 * | 5/2007 | Jo et al. ....................... 713/158 |
| 2007/0230459 | A1 * | 10/2007 | Giaretta et al. ............... 370/389 |
| 2007/0242638 | A1 * | 10/2007 | Arkko et al. ................. 370/331 |

OTHER PUBLICATIONS

Ng et al.; (Extending Return Routability Procedure for Network Prefix (RRNP); 2004; NEMO Working Group; pp. 1-24.*
U.S. Appl. No. 11/602,292, filed Nov. 12, 2006, Thubert et al.
Bernardos et al., "Mobile IPv6 Route Optimisation for Network Mobility (MIRON)", NEMO Working Group, Internet Draft, <draft-bernardos-nemo-miron-00>, Jul. 11, 2005, pp. 1-16.
Gundavelli et al., "Localized Mobility Management using Proxy Mobile IPv6", NETLMM BOF, Internet Draft, <draft-gundavelli-netlmm-mip6-proxy-00.txt>, Nov. 8, 2005, pp. 1-30.

(Continued)

*Primary Examiner*—Ricky Ngo
*Assistant Examiner*—Dewanda Samuel
(74) *Attorney, Agent, or Firm*—Leon R. Turkevich

(57) ABSTRACT

In one embodiment, a method includes generating by a mobile router a home test message that includes a prefix option field specifying at least one mobile network prefix claimed to be owned by the mobile router. The method also includes outputting the home test message by the mobile router to a correspondent node via a prescribed home agent assigned to the mobile router, for initiation of a reverse routability test between the mobile router and the correspondent node that verifies the mobile router owns the at least one mobile network prefix. In another embodiment, the home agent is configured for forwarding a route optimization message, for example the home test message, to the correspondent node if the home agent determines that the at least one mobile network prefix is owned by the mobile router.

23 Claims, 5 Drawing Sheets

OTHER PUBLICATIONS

Ng et al., "Taxonomy of Route Optimization models in the NEMO Context", NEMO Working Group, Internet Draft, <draft-thubert-nemo-ro-taxonomy-04>, Feb. 21, 2005, pp. 1-37.

Wakikawa et al., "Optimized Route Cache Protocol (ORC)", Internet Draft, <draft-wakikawa-nemo-orc-01.txt>, Oct. 24, 2004, pp. 1-22.

Johnson et al., "Mobility Support in IPv6", Network Working Group, Request for Comments: 3775, Jun. 2004, pp. 1-165.

Devarapalli et al., "Network Mobility (NEMO) Basic Support Protocol", Network Working Group, Request for Comments: 3963, Jan. 2005, pp. 1-33.

* cited by examiner

Binding Update Message (Prefixes Only), 76a

Explicit Binding Update (Care-of Address and Prefixes), 76b

ROUTE OPTIMIZATION BETWEEN A MOBILE ROUTER AND A CORRESPONDENT NODE USING REVERSE ROUTABILITY NETWORK PREFIX OPTION

TECHNICAL FIELD

The present disclosure generally relates to route optimization between a mobile router, providing connectivity for attached mobile hosts, and a correspondent node reachable via a wide area network such as the Internet.

BACKGROUND

The Internet Engineering Task Force (IETF) Request for Comments (RFC) 3775 describes a route optimization (RO) between a mobile host (MH) and a correspondent node (CN) using a return routability procedure, where the correspondent node can verify that a care-of address and a home address are owned by the same mobile host. The mobile host sends to the correspondent node a Home Test Init (HoTI) message, via a tunnel to its home agent, that specifies in the source address field the home address of the mobile host; the mobile host also sends a Care-of Test Init (CoTI) Message directly to the correspondent node, i.e., via a path that bypasses the home agent, and specifies in the source address field the care-of address of the mobile host. The correspondent node responds to the HoTi message by sending to the home address a Home Test (HoT) message that includes a first unique token ("home keygen token") generated from the mobile host's home address: assuming the mobile host has properly registered with the home agent by sending a binding update to the home agent, the HoT message is forwarded by the home agent to the mobile host via the corresponding home agent-mobile host tunnel. If the home address is not registered with the home agent (e.g., the home address is "spoofed" by a rogue node), the home agent will drop the HoT message. The correspondent node responds to the CoTI message by sending to the care-of address a Care-of Test (CoT) message that includes a second unique token ("care-of keygen token") generated from the care-of address: the CoT message is sent to the MH via its care-of address, bypassing the home agent.

If the mobile host receives both the HoT message and the CoT message, the first and second unique tokens are combined by the mobile host into a binding management key (Kbm): the binding management key is included in a binding update message sent to the correspondent node that specifies that the home address of the MH is reachable via the care-of address of the MH. The correspondent node, upon receiving the binding update message, is able to decode the first and second unique tokens from the binding management key to verify that the mobile host owns both the home address and the care-of address.

RFC 3963 describes a Network Mobility (NEMO) Basic Support protocol as an extension of Mobile IPv6 as described in RFC 3775. However, RFC 3963 specifies in Section 1 that route optimization is not described therein, rather all traffic between the nodes in the mobile network and the correspondent nodes passes through the home agent.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
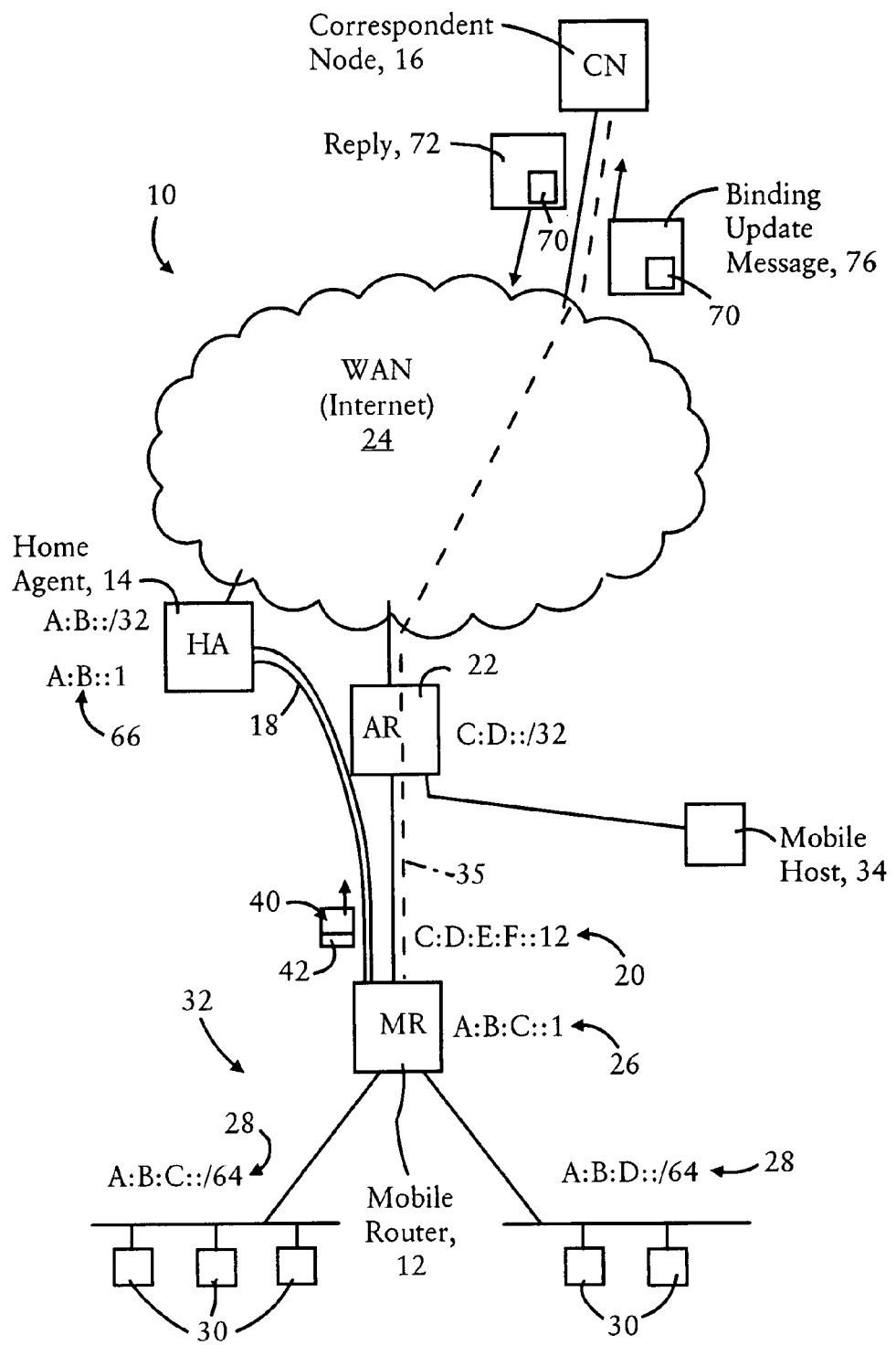
FIG. 1 illustrates a network having a mobile router, a home agent, and a correspondent node, providing route optimization between the mobile router and the correspondent node according to an example embodiment.

In one embodiment, a method comprises generating by a mobile router a home test message that includes a prefix option field specifying at least one mobile network prefix claimed to be owned by the mobile router. The method also comprises outputting the home test message by the mobile router to a correspondent node via a prescribed home agent assigned to the mobile router, for initiation of a reverse routability test between the mobile router and the correspondent node that verifies the mobile router owns the at least one mobile network prefix.

In another embodiment, a method comprises receiving by a home agent a route optimization message from one of a mobile router or a correspondent node as part of an attempted route optimization between the mobile router and the correspondent node, the route optimization message specifying a home address of the mobile router and a prefix option field specifying at least one mobile network prefix. The method also includes determining by the home agent whether the at least one mobile network prefix is owned by the mobile router based on the corresponding home address, and if the home agent determines that the at least one mobile network prefix is owned by the mobile router, forwarding the received message by the home agent between the mobile router and the correspondent node based on a destination address field in the home test message.

In yet another embodiment, a method includes receiving, by a correspondent node, a home test message from a mobile router via a home agent of the mobile router, the home test message including a source address field specifying a home address of the mobile router and a prefix option field specifying at least one mobile network prefix owned by the mobile router. The method also includes generating a reply to the home test message by the correspondent node, the reply including, for each mobile network prefix owned by the mobile router, a corresponding signature generated by the correspondent node based on the corresponding mobile network prefix, an identified home address of the mobile router, and a prescribed secret key maintained by the correspondent node. The method also includes outputting the reply to the mobile router via the home agent.

DETAILED DESCRIPTION

Particular embodiments extend the Network Mobility (NEMO) Basic Support protocol, as specified in RFC 3963, by enabling route optimization between a mobile network (managed by a mobile router) and a correspondent node. In particular, a mobile router is configured to provide connectivity for a mobile network to a wide area network, such as the Internet, based on the mobile router establishing a bidirectional tunnel with its prescribed home agent. Mobile hosts within the mobile network send packets destined outside the mobile network to the mobile router. The mobile network is addressable via at least one mobile network prefix owned by the mobile router.

The particular embodiments enable the mobile router to perform route optimization with the correspondent node, based on the mobile router generating a modified Home Test Init message that includes a prefix option field. The prefix option field specifies at least one address prefix that is claimed to be owned by the mobile router. The mobile router outputs the modified Home Test Init (HoTI) message (including the prefix option field) to the correspondent node via the mobile router's home agent. The home agent, in response to receiving the modified HoTI message via the corresponding mobile router-home agent tunnel, determines whether the at least one address prefix specified in the prefix option field is a valid prefix owned by the mobile router. If the address prefix in the prefix option field is deemed by the home agent as not a valid prefix owned by the mobile router, the home agent drops the modified HoTI message. If, however, the home agent determines the address prefix in the prefix option field is a valid prefix owned by the mobile router, the home agent forward the modified HoTI message to the correspondent node. Hence, the home agent validates the modified HoTI message to ensure the mobile router owns the corresponding home address and each address prefix specified in the modified HoTI message.

Hence, the correspondent node can receive the modified HoTI message after validation by the home agent. The correspondent node can generate its own signature for each received address prefix, and send back to the mobile router the signature for the corresponding address prefix, enabling the mobile router to authenticate itself for each message using the signature generated by the correspondent node. Hence, the correspondent node is able to verify the mobile router's specified network prefix, without the correspondent node maintaining any state information prior to reception of any binding update message, based on validating its received signature on subsequent messages from the mobile router (e.g., a binding update message in explicit mode specifying the mobile network prefix and the corresponding signature generated by the correspondent node). Since the correspondent node does not need to store any prior state information, the correspondent node does not need to consume any memory resources, enabling the correspondent node to resist Denial of service (DOS) attacks. Hence, this operation is completely stateless before the binding.

The mobile router and the correspondent node also can implement the Return Routability Procedure as described above with respect to RFC 3775, enabling the correspondent node to verify that the mobile router owns a specified home address and a specified care-of address (i.e., that the home address and the care-of address are co-located at the mobile router). In contrast to the return routability procedure described in RFC 3775, where a mobile host cannot provide any more authentication other than that it owns both the care-of address and the home address (and does not establish any further trust between the mobile host and the correspondent node), the example embodiments described herein enable the correspondent node to determine that the mobile router owns the specified prefix, as well as the specified home address and the specified care-of address. Hence, the example embodiments describe how the correspondent node can determine that the mobile router owns the care-of address, the home address, and the at least one mobile network prefix, in order to establish an optimized path for the specified mobile network prefixes between the correspondent node and the mobile router that bypasses the mobile router-home agent tunnel.

As described below, the modified HoTI message may be a substitute for the original HoTI message described in RFC 3775, enabling the concurrent validation of the home address with the mobile network prefixes; alternately, the modified HoTI message described herein can be sent by the mobile router as a procedure distinct from the Return Routability Procedure described in RFC 3775.

Regardless of whether the modified HoTI message is a substitute for the original HoTI message or in addition to the original HoTI message, the correspondent node can create binding cache entries that the validated mobile network prefix is reachable via the validated home address of the mobile router, and that the validated home address of the mobile router is reachable via the validated care-of address of the mobile router. Further, the example embodiments enable authentication of the home address and the mobile network prefixes to be performed solely between the mobile router, the correspondent node, and the home agent, without the necessity of any additional resource such as a route server, as described for example in U.S. Patent Publication No. 2004/0202183 A1, published Oct. 14, 2004.

FIG. 1 illustrates a network 10 having a mobile router 12, a home agent 14, and a correspondent node 16, according to an example embodiment. The mobile router 12 is configured for establishing a tunnel 18 with its home agent 14 according to existing Mobile IP protocol as described in RFC 3775 and 3963. In summary, the mobile router 12 obtains an IPv6 care of address "C:D:E:F::12" 20 from an access router 22 providing connectivity to a wide area network 24 such as the Internet. Upon receiving the care of address 20 from the access router 22, the mobile router 12 sends a binding update message to its home agent 14 specifying that the mobile router 12 (identified by its home address "A:B:C::1" 26) is reachable via the care of address 20. The home agent 14 updates its bind cache entry in response to the binding update message to specify that the home address 26 of the mobile router 12 is reachable via the care of address 20 specified in the binding update message. As described in RFC 3963, the mobile router 12 can send the binding update message in an explicit mode, including network prefix options specifying the mobile network prefixes 28 owned by the mobile router 12, enabling the home agent 14 to update its bind cache entries to specify that the mobile network prefixes 28 and the home address 26 of the mobile router 12 each are reachable via the care of address 20.

Hence, each of the mobile hosts 30 within the mobile network 32 controlled by the mobile router 12 are able to send and receive packets to destinations such as the correspondent node 16 via the mobile router-home agent tunnel 18.

As described above, RFC 3775 describes a route optimization for a mobile host 34 to establish an optimized path for reaching the correspondent node 16 based on the mobile host 34 specifying that its home address is reachable via its care of address. However, RFC 3775 is limited to operations by a mobile IPv6 host 34 and does not describe mobility of mobile networks such as the mobile network 32.

Figure 5:
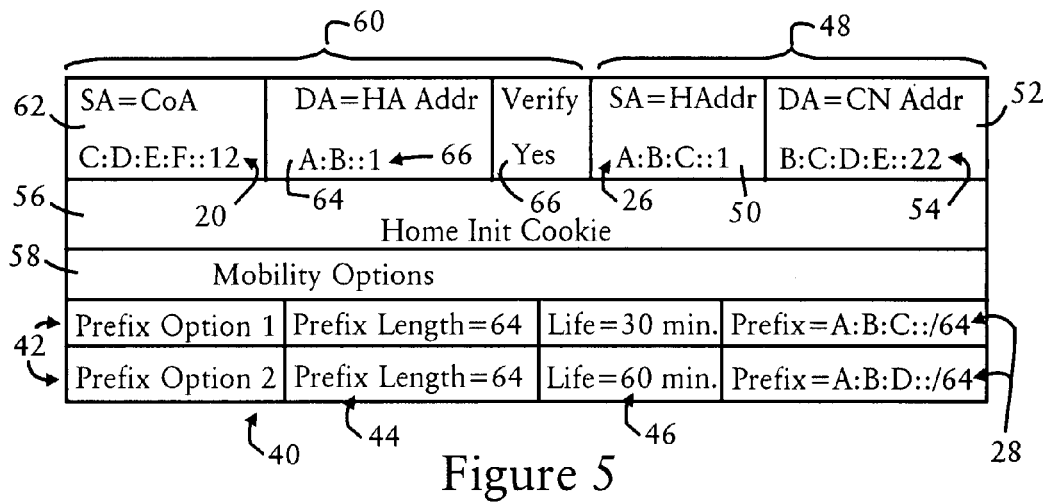
FIG. 5 illustrates an example modified home test message output by the mobile router of FIG. 2.

The example mobile router 12, the home agent 14, and the correspondent node 16 can establish an optimized route 35 between the correspondent node 16 and the mobile network 32 that bypasses the mobile router-home agent tunnel 18, without the necessity of any proxy device or route server, based on the mobile router 12 outputting a modified Home Test Init message 40 having at least one prefix option field 42, illustrated in FIG. 5. As described below, the modified Home Test Init message 40, also referred to herein as the home test message 40, is output to the correspondent node 16 via the home agent 14 using the mobile router-home agent tunnel 18; the home agent 14 validates the modified Home Test Init message 40 to determine whether the specified mobile network prefixes 28 in the prefix option field 42 are owned by the mobile router; if the specified mobile network prefixes 28 are not owned by the mobile router 12, the home agent 14 drops the message 40; however, if the home agent 14 validates each mobile network prefix in the prefix option field 42, the home agent 14 forwards the message to the correspondent node 16.

The correspondent node 16, in response to receiving the modified Home Test Init message 40, generates for each specified prefix a corresponding signature 70, described below, and outputs a reply message 72, illustrated in FIG. 6. The mobile router 12, in response to receiving the reply message 72, stores each of the signatures 70 for the corresponding prefixes 28, and sends back to the correspondent node 16 a binding update message 76, illustrated as binding update messages 76a and 76b in FIGS. 7A and 7B, respectively, which includes for each specified prefix the corresponding signature 70 generated by the correspondent node 16, enabling the correspondent node to validate that the prefixes 28 are owned by the mobile router 12 having the specified home address 26.

Hence, the mobile router 12, the home agent 14, and the correspondent node 16 can establish an optimized route between the mobile router 12 and the correspondent node 16 for the mobile network prefixes 28 served by the mobile router 12 in the mobile network 32, without the prior storage of state information by the correspondent node 16 before reception of the binding update messages, or the reliance on any external route server.

Figure 2:
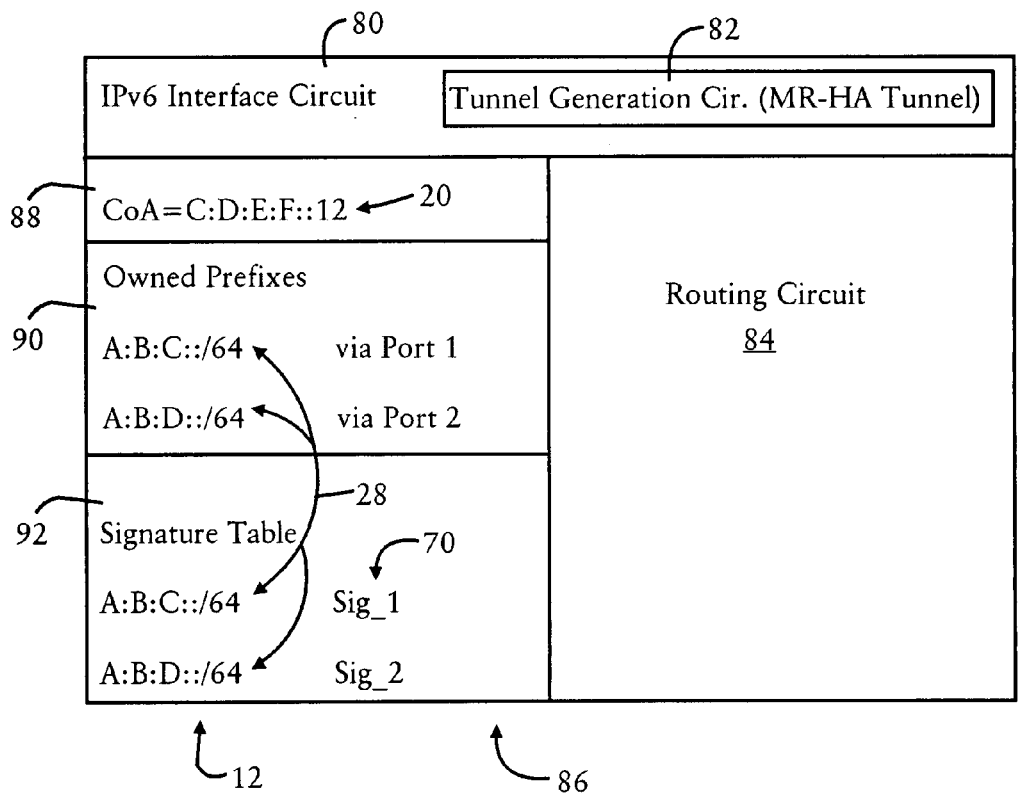
FIG. 2 illustrates an example mobile router from the system of FIG. 1.

FIG. 2 illustrates an example mobile router 12 from the network 10 of FIG. 1. The mobile router 12 includes an IPv6 network interface circuit 80 configured for sending and receiving IPv6 data packets, and includes a tunnel generation circuit 82 for generating the mobile router-home agent tunnel 18. The mobile router 12 also includes a routing circuit 84, and a memory portion 86 that includes a care of address register 88, a table 90 of mobile network prefixes 28 owned by the mobile router 12, and a table 92 configured for storing signatures 70 having been received from a correspondent node 16 for respective prefixes 28. As described in further detail below with respect to FIG. 8, the routing circuit 84 is configured for generating the modified Home Test Init message 40 of FIG. 5, also referred to as the home test message, and storing the received signatures 70 into the signature table 92. The routing circuit 84 also is configured for generating the binding update messages 76a and/or 76b of FIGS. 7A and 7B. The routing circuit 84 also can be configured for performing other mobile router operations, including the mobile IPv6 operations described in RFC 3775 and RFC 3963.

Figure 3:
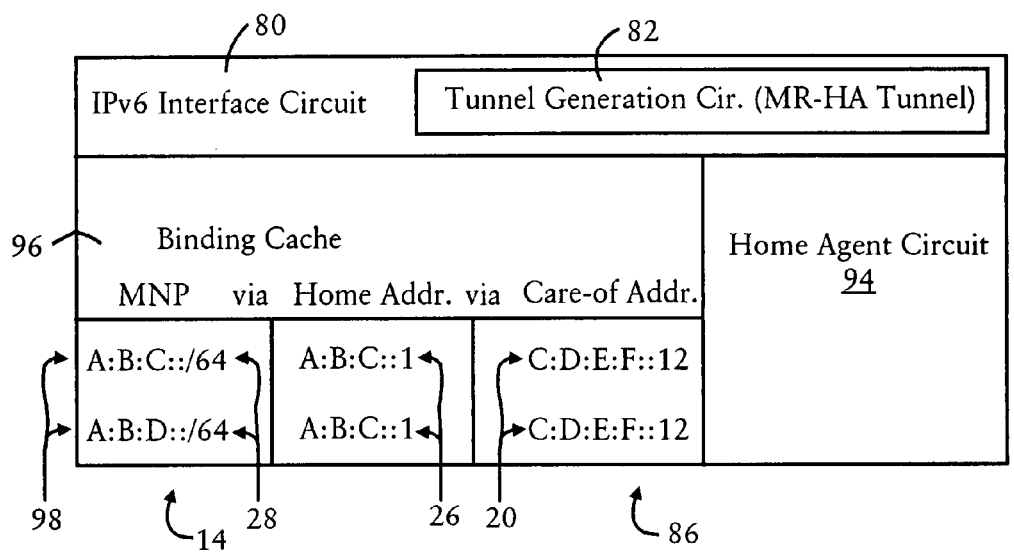
FIG. 3 illustrates an example home agent from the system of FIG. 1.
Figure 4:
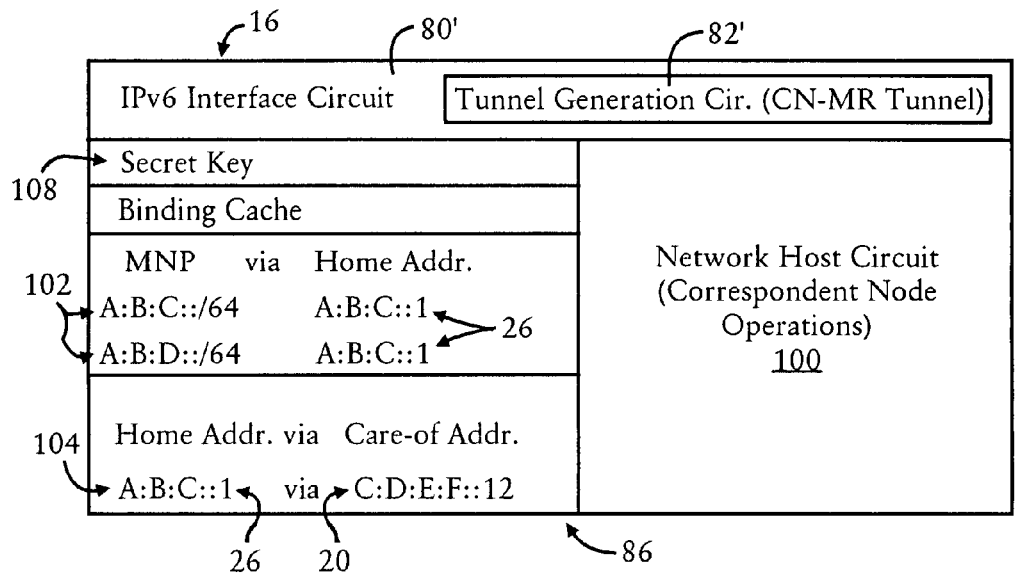
FIG. 4 illustrates an example correspondent node from the system of FIG. 1.

FIG. 3 illustrates an example home agent 14 from the network 10 of FIG. 1. The home agent 14 includes the IPv6 network interface circuit 80 that includes the tunnel generation circuit 82. The home agent 14 also includes a home agent circuit 94 configured for performing home agent operations as described in RFC 3775 and RFC 3963, including updating a binding cache 96 having entries 98 for each mobile network prefix 28 owned by the mobile router 12. In particular, the home agent circuit 94, in response to receiving a binding update message in explicit mode from the mobile router 12, stores in the binding cache 96 the entries 98 specifying that the corresponding mobile network prefix 28 is reachable via the home address 26 of the mobile router, and that the home address 26 of the mobile router is reachable via the care of address 20 specified in the binding update message. It will be recognized at each of the data structures of the mobile router 12, the home agent 14 and the correspondent node 16 of FIGS. 2, 3, and 4 are by way of illustration only, and that other forms of storing the relevant information may be implemented (e.g., indexing the table by home address instead of mobile network prefix, etc.).

As described below, the home agent circuit 94 also is configured for validating the home test message 40 output by the mobile router 12 to verify that the specified prefixes are owned by the mobile router, for example in response to detecting the verify flag 66, or by sniffing each packet to determine packet type: if the home agent circuit 94 determines from the binding cache 96 that the specified prefixes 28 in the prefix option fields 42 of the home test message 40 are not owned by the mobile router 12 (as identified by its home address 26), the home agent circuit 94 drops the home test message 40. If, however, the home agent circuit 94 verifies that the specified prefixes 28 in the prefix option fields 42 of the home test message 40 are owned by the mobile router 12, the home agent circuit 94 passes the home test message 40 (minus the routing header 60) to its IPv6 interface circuit 80, for delivery to the correspondent node 16 via the wide area network 24.

The home agent circuit 94 also can be configured for validating any prefixes 28 specified in the prefix option fields 128 of the reply message 72 output from the correspondent node 72 and destined for the mobile router 12 via its home address 26, based on determining whether the prefixes specified in the prefix option fields 128 are specified in the binding cache 96. Hence, the home agent circuit 94 also can ensure that the correspondent node is not "spoofed" by any rogue node impersonating the mobile router 12 that attempts to send a forged home test message via some path that bypasses the home agent 14.

Hence, the home agent circuit 94 can ensure that any prefixes specified in the home test message 40 or the reply message 72 are owned by the mobile router 26 based on the corresponding home address 26. As such, the home agent circuit 94 can validate prefixes specified in any route optimization message (e.g., 40, 72), where the term "route optimization message" refers to any message exchanged between the mobile router 12 and the correspondent node via the home agent 14 for purposes of route optimization (between the mobile router 12 and the correspondent node 16) and that specifies a mobile router home address 26 and prefixes 28 claimed to be owned by the mobile router 12.

FIG. 4 illustrates an example correspondent node from the network 10 of FIG. 1. The correspondent node 14 includes an IPv6 interface circuit 80' that includes a tunnel generation circuit 82': the tunnel generation circuit 82' is used to establish a tunnel 35 between the correspondent node 16 and the mobile router 12 upon having completed route optimization, described below. The correspondent node 16 further includes a network host circuit 100 that can perform correspondent node operations, including adding the binding cache entries 102 specifying that a validated mobile network prefix 28 is reachable via a validated home address 26, and adding the binding cache entry 104 specifying that the home address 26 is reachable via the care of address 20.

Figure 7A:
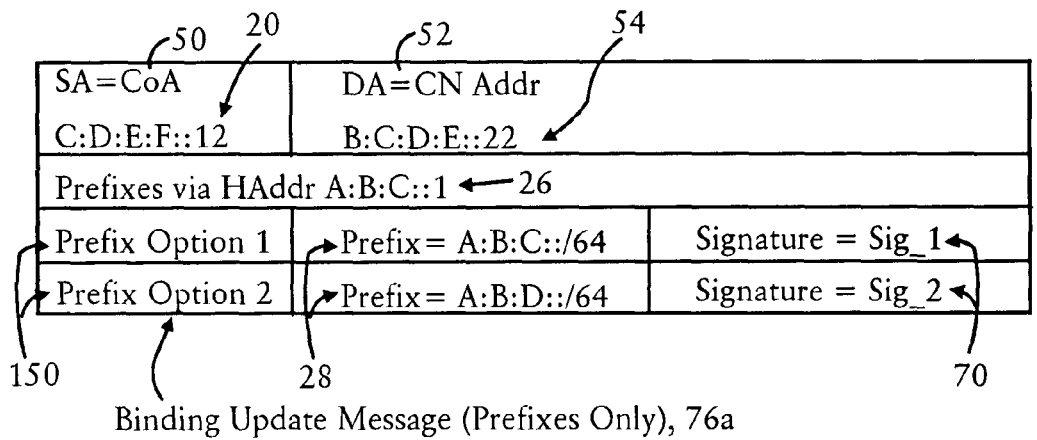
FIGS. 7A and 7B illustrate alternative example binding update messages output by the mobile router of FIG. 2.

The network host circuit 100 can add the binding cache entry 104 using the return routability procedure described in RFC 3775, and the binding cache entries 102 based on the prefix-only binding update message 76a illustrated in FIG. 7A, where updating of the binding cache entries 102 using the prefix-only binding update message 76a serves as an extension of the existing return routability procedure described in RFC 3775. Alternately, the network host circuit 100 also can add the binding cache entries 102 and 104 based on the explicit binding update message 76b of FIG. 7B, where the Home Test Init message described in RFC 3775 is replaced with the modified home test message 40 of FIG. 5, and the binding update message described in RFC 3775 is replaced with the explicit binding update message 76b of FIG. 7B.

Any of the disclosed circuits of the mobile router 12, the home agent 14, or the correspondent node 16 (e.g., circuits 80, 80', 82, 82', 84, 94, or 100) can be implemented in multiple forms, including hardware logic that is implemented in a logic array such as a programmable logic array (PLA), a field programmable gate array (FPGA), or an application-specific integrated circuit (ASIC); any of these circuits also can be implemented using a software-based executable resource that is executed by a corresponding internal processor (not shown), where execution of executable code stored in internal nonvolatile memory (not shown) causes the processor to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor.

Figure 8:
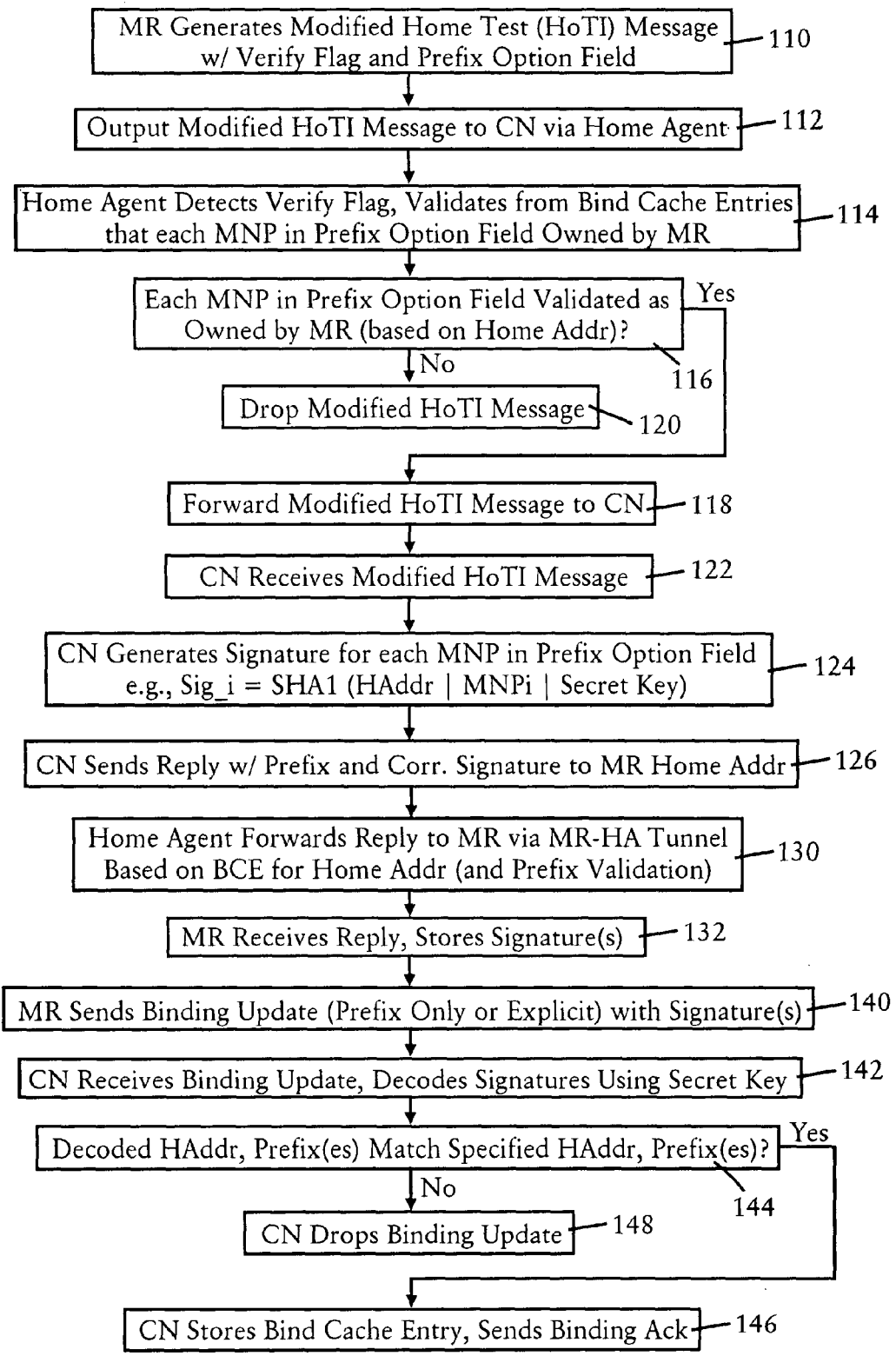
FIG. 8 illustrates an example method of route optimization between the mobile router, the home agent, and the correspondent node of FIG. 1.

FIG. 8 illustrates an example method of route optimization between the mobile router 12, the home agent 14, and the correspondent node 16 of FIG. 1. The steps described herein with respect to FIG. 8 can be implemented as executable code stored on a computer readable medium (e.g., floppy disk, hard disk, EEPROM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

The disclosed method assumes that at least a portion of the return routability procedure as described in RFC 3775 is performed between the mobile router 12 in the correspondent node 16, enabling the correspondent node 16 to validate that both the home address 26 and the care of address 20 are owned by the mobile router 12. Hence, the disclosed method provides the extension of enabling the correspondent node 16 to validate that the mobile router 12 (as identified by its home address 26) owns each of the prefixes 28. Since the correspondent node 16 already can validate that the home address 26 and the care of address 20 are owned by the same network node, the added ability of the correspondent node 16 to associate validated mobile network prefixes 28 as reachable via the validated home address 26, in combination with associating the validated home address 26 reachable via the validated care-of address 20, enables the network host circuit 100 to establish an optimized path in the form of a tunnel 35 between itself and the mobile router 12 for traffic destined to the mobile network prefixes 28, bypassing the mobile router-home agent tunnel 18.

The method begins in step 110, where the routing circuit 84 in the mobile router (MR) 12 generates the modified home test message 40 of FIG. 5. In particular, the routing circuit 84 retrieves the owned prefixes 28 from its prefix table 90 for generation of the modified home test message 40.

FIG. 5 illustrates an example home test message 40 output by the mobile router 12 of FIG. 2. The modified Home Test Init message 40, illustrated in FIG. 5, includes at least one prefix option field 42 specifying a corresponding mobile network prefix 28, and preferably also a prefix length field 44 and a lifetime field 46. The modified Home Test Init message 40 also includes a first IPv6 header 48 having a source address field 50 specifying the home address 26 of the mobile router 12 and a destination address field 52 specifying the IPv6 address 54 of the correspondent node 16. The modified Home Test Init message 40 also can include a cookie 56 generated by the mobile router 12, and mobility options fields 58, both of which are described in the RFC 3775. The modified Home Test Init message 40 also includes a second IPv6 header 60 having a source address field 62 specifying the care of address 20 of the mobile router 12, and a destination address field 64 specifying the IPv6 address 66 of the home agent 14. The second IPv6 header 60 also includes a data structure 66 such as a single-bit verify flag field to cause the home agent to perform mobile network prefix verification, described below.

Hence, the routing circuit 84 of the mobile router 12 outputs to its IPv6 interface circuit 80 the modified Home Test Init message 40 in step 112 for output to the correspondent node 16 via the home agent 14 using the tunnel 18.

The IPv6 interface circuit 80 of the home agent 14 receives in step 114 the home test message 40 from the mobile router 12 via the mobile router-home agent tunnel 18. The home agent circuit 94 detects in step 114 the verify flag 66 in the home test message 40, and in response validates from its binding cache entries 98 that each mobile network prefix 26 specified in the corresponding prefix option field 42 is owned by the mobile router 12 identified by its home address 26 specified in the source address field 50. If in step 116 the home agent circuit 94 determines that each of the mobile network prefixes 28 specified in the prefix option fields 42 of the home test message 40 are identified from its binding cache entries 98 as belonging to the home address 26 specified in the source address field 50 of the home test message 40, the home agent circuit 94 forwards in step 118 the home test message 40 (minus the header 60) to the correspondent node 16 via the wide area network 24. If, however, the home agent circuit 94 determines in step 116 that any one of the mobile network prefixes 28 in the prefix option field 42 is not identified by the binding cache entries 98 as belonging to the mobile router 12 (as identified by its home address 26), the home agent circuit 94 drops the home test message in step 120. The home agent circuit 94 also can use alternate methods for validating the prefixes 28 in the prefix option fields, for example based on a prescribed mapping between the home address 26 and the prefixes authorized for the mobile router 12, for example as described in commonly-assigned, copending application Ser. No. 11/602,292, filed Nov. 21, 2006, entitled "Mobile Network Automatic Tunnels".

Hence, the home agent provides automatic authentication of the mobile network prefixes 28 specified in the home test message 40. As described previously, the home test message 40 may be sent in addition to the HoTI message as specified in RFC 3775, or may be sent in place of the HoTI message specified in 3775.

The IPv6 interface circuit 80' of the correspondent node 16 receives in step 122 the modified HoTI message (i.e., the home test message) 40 (minus the routing header 60). The network host circuit 100 in response generates in step 124, for each mobile network prefix 28 specified in the corresponding prefix option field 42, a corresponding signature using a secret key 108 stored in the memory portion 86 of the correspondent node 16. In particular, the network host circuit 100 generates an SHA-1 based hash using the home address value 26 specified in the home test message 40, the corresponding mobile network prefix (e.g., "A:B:C::/64"), and the secret key 108; additional details related to generating a secure key are described in the RFC 3775. The resulting signature (e.g., "Sig_1") 70 therefore represents a secure representation of a correlation between the home address 26, the corresponding prefix (e.g., "A:B:C::/64"), and the secret key 108, enabling the network host circuit 100 to recover the home address 26 and the corresponding prefix (e.g., "A:B:C::/64") by decoding the signature (e.g., "Sig_1") 70 using the secret key 108.

Figure 6:
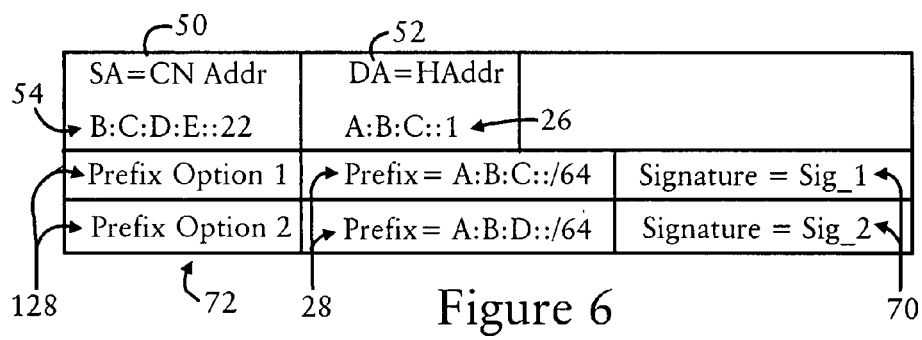
FIG. 6 illustrates an example reply to the modified home test message of FIG. 5, generated by the correspondent node of FIG. 4.

After the network host circuit 100 has generated the signature (e.g., "Sig_1", "Sig_2") 70 for each corresponding mobile network prefix (e.g., "A:B:C::/64", "A:B:D::/64") 28, the network host circuit 100 generates and sends in step 126 the reply 72 of FIG. 6, including the prefix option fields 128 specifying corresponding signatures 70 for each prefix 28 specified in the home test message 40. As illustrated in FIG. 6, the destination address field 52 of the reply 72 specifies the home address 26 of the mobile router 12; hence, the home agent circuit 94 of the home agent 14, in response to receiving in step 130 the reply 72, forwards the reply 72 to the mobile router 12 via the mobile router-home agent tunnel 18 based on the bind cache entry 98 specifying the care of address 20 for the home address 26. The home agent circuit 94 also can optionally validate the prefixes 28 specified in the prefix option fields 128 of the reply message 72 to ensure that the specified prefixes 28 are owned by the mobile router identified by the home address 26 specified in the destination address field, according to the binding cache 96. As described with respect to steps 116 and 120, if the prefixes 28 specified in the prefix option fields 128 of the reply message 72 are determined by the home agent circuit 94 to not be owned by the mobile router based on the corresponding binding cache entry (e.g., 98), the reply message 72 is dropped to prevent the correspondent node 16 from being spoofed.

In response to the IPv6 interface circuit 80 of the mobile router 12 receiving in step 132 the reply 72, the routing circuit 84 stores in step 132 the signatures 70 for each of the prefixes 28 in the signature table 92. Although not shown in FIG. 2, it is assumed that the mobile router 12 also has received at least the care of keygen token 134, according to RFC 3775. If needed, the mobile router 12 also can perform the reverse routability procedure according to RFC 3775 in order to also receive the home keygen token 136 in order to generate the binding management key 138, illustrated in FIG. 7B; however, since the signatures 70 include the encoded home address information, the home keygen token 136 (and resulting binding management key 138) may not be needed, since the signatures 70 in combination with the care of keygen token 134 can be sufficient to establish for the correspondent node 16 that the mobile router 12 owns the prefixes 28, the home address 26, and the care-of address 20.

Figure 7B:
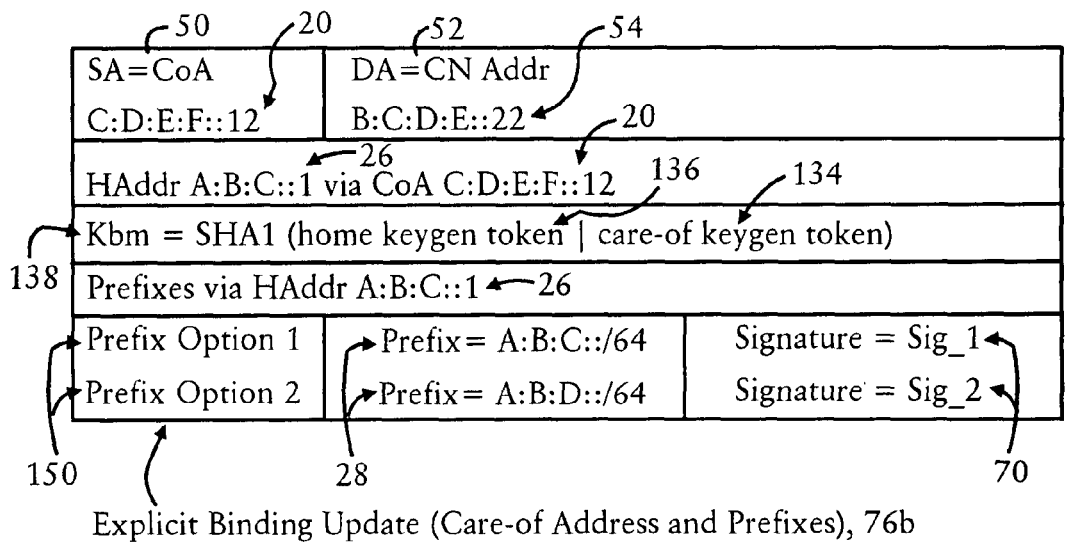

The routing circuit 84 of the mobile router 12 generates in step 140 a binding update message 76 based on the received signatures 70, for example either the prefix-only binding update message 76a of FIG. 7A (assuming the reverse routability procedure of RFC 3775 has already been performed between the mobile router 12 and the correspondent node 16), or the explicit binding update message 76b of FIG. 7B (assuming the disclosed home test message 40 and the explicit binding update message 76b replace the HoTI message and the binding update message described in RFC 3775). As illustrated in FIG. 7A, if the correspondent node 16 already has validated that the care of address 20 is co-located with the home address 26, the routing circuit 84 only needs to validate that the specified prefixes 28 are associated with the home address 26 by supplying the respective signatures 70. However, if the correspondent node 16 has not yet received validation that the care of address 20 is co-located with the home address 26, then the routing circuit 84 can output the explicit binding update message 76b that provides the binding management key 138 (or at least the care-of keygen token 134) with the signatures 70, enabling the correspondent node 116 to validate the home address 26, the care of address 20, and the prefixes 28 based on the single explicit binding update message 76b. Each signature 70 also can be hashed with the care-of keygen token 134 by the routing circuit 84 of the mobile router 12 for added security, if preferred, in which case the network host circuit 100 would be able to decode each hash to recover the care-of keygen token and the corresponding signature 70.

The routing circuit 84 sends in step 140 the appropriate binding update message 76a or 76b to the correspondent node 16 in step 140 with the signatures 70 of the respective prefixes 28.

In response to the correspondent node 16 receiving the binding update message 76a or 76b, the network host circuit 100 decodes in step 142 each signature 70 using the stored secret key 108. If in step 144 all of the decoded signatures 70 result in the decoded home address and decoded prefixes matching the home address 26 specified in the binding update message 76, and each of the decoded prefixes matching the specified prefixes 28 in the prefix option fields 150, the network host circuit updates its binding cache with the binding cache entries 102 in step 146. If the received binding update message is the explicit binding update message 76b and the decoding of the binding management key 138 (or at least the care-of keygen token 134) successfully validates the home address 26 and the care of address 20 are owned by the same network node, the network host circuit 100 also updates the binding cache entry 104 to specify the home address 26 is reachable via the care of address 20. If, however, any one of the decoded signatures 70 does not provide a match with the specified home address 26 or the specified prefixes 28, the network host circuit 100 drops the binding update message in step 148.

According to the example embodiments, route optimization can be implemented between a mobile router and a correspondent node, without the necessity of prior state information by the correspondent node, in accordance with RFC 3775. In addition, route optimization can be performed solely between the mobile router, the home agent, and the correspondent node, eliminating the necessity of any interactions (e.g., queries, etc.) with any route server.

What is Claimed is:

1. A method comprising:
generating by a mobile router a home test message that includes a prefix option field specifying at least one mobile network prefix claimed to be owned by the mobile router; and
outputting the home test message by the mobile router to a correspondent node via a prescribed home agent assigned to the mobile router, for initiation of a reverse routability test between the mobile router and the correspondent node that verifies the mobile router owns the at least one mobile network prefix;
receiving, as part of the reverse routability test, a reply addressed to the mobile router from the correspondent node that includes the at least one mobile network prefix and at least one corresponding signature; and outputting a binding update message to the correspondent node in response to the reply, the binding update message specifying the at least one mobile network prefix is reachable via a home address used by the mobile router, the binding update message including the corresponding at least one signature specified in the reply.

2. The method of claim 1, wherein:
the generating of the home test message includes specifying the home address in a source address field of the home test message;
the receiving includes detecting the home address in a destination address field of the reply.

3. The method of claim 1, wherein the outputting of the binding update message includes specifying a care-of address of the mobile router in a source address field of the binding update message and adding within the binding update message a second signature associated with the care-of address.

4. The method of claim 1, wherein the generating includes inserting a data structure in the home test message that causes the home agent to validate that the mobile router owns the at least one mobile network prefix.

5. A method comprising:
receiving by a home agent a route optimization message from one of a mobile router or a correspondent node as part of an attempted route optimization between the mobile router and the correspondent node, the route optimization message specifying a home address of the mobile router and a prefix option field specifying at least one mobile network prefix;
determining by the home agent whether the at least one mobile network prefix is owned by the mobile router based on the corresponding home address;
if the home agent determines that the at least one mobile network prefix is owned by the mobile router, forwarding the received route optimization message by the home agent between the mobile router and the correspondent node based on a destination address field specified in the home test message; and
dropping the received route optimization message if the home agent determines that the at least one mobile network prefix is not owned by the mobile router.

6. The method of claim 5, wherein the determining includes performing the determining in response to detecting a prescribed data structure in the received route optimization message that indicates validation of the at least one mobile network prefix is to be performed.

7. The method of claim 5, wherein the determining includes detecting whether the at least one mobile network prefix is identified, in a bind cache entry in the home agent, as assigned to the home address assigned to the mobile router.

8. A method comprising:
receiving, by a correspondent node, a home test message from a mobile router via a home agent of the mobile router, the home test message including a source address field specifying a home address of the mobile router and a prefix option field specifying at least one mobile network prefix owned by the mobile router;
generating a reply to the home test message by the correspondent node, the reply including, for each mobile network prefix owned by the mobile router, a corresponding signature generated by the correspondent node based on the corresponding mobile network prefix, an identified home address of the mobile router, and a prescribed secret key maintained by the correspondent node;
outputting the reply to the mobile router via the home agent;
receiving a binding update message from the mobile router via the home agent, the binding update message specifying the home address in the corresponding source address field, the at least one mobile network prefix, and a corresponding supplied signature; and
selectively adding a routing table entry for each specified mobile network prefix in the binding update message, based on validating the corresponding signature in the binding update message.

9. The method of claim 8, wherein the validating includes determining whether a prescribed correlation exists between each supplied signature and the corresponding specified mobile network prefix, based on applying the prescribed secret key to each supplied signature.

10. The method of claim 9, wherein the prescribed correlation further is based on the home address, the determining including whether each supplied signature matches the prescribed correlation of the corresponding mobile network prefix with the home address and the prescribed secret key.

11. An apparatus comprising:
a first circuit configured for establishing a tunnel connection with a prescribed home agent; and
a routing circuit configured for generating a home test message and outputting the home test message via the first circuit to a correspondent node via the prescribed home agent, the home test message further including a prefix option field specifying at least one mobile network prefix claimed to be owned by the apparatus as a mobile router, for initiation of a reverse routability test between the mobile router and the correspondent node that verifies the mobile router owns the at least one mobile network prefix, wherein:
the first circuit is configured for receiving, as part of the reverse routability test, a reply addressed to the mobile router from the correspondent node that includes the at least one mobile network prefix and at least one corresponding signature;
the routing circuit configured for generating and outputting to the correspondent node a binding update message in response to the reply, the binding update message specifying the at least one mobile network prefix is reachable via a home address used by the mobile router, the binding update message including the corresponding at least one signature specified in the reply.

12. The apparatus of claim 11, wherein:
the routing circuit is configured for specifying the home address in a source address field of the home test message;
the routing circuit configured for detecting the home address in a destination address field of the reply.

13. The apparatus of claim 11, wherein the routing circuit is configured for specifying within the binding update message a care-of address of the mobile router in a source address field of the binding update message, and adding within the binding update message a second signature associated with the care-of address.

14. The apparatus of claim 11, wherein the routing circuit is configured for inserting a data structure in the home test message that causes the home agent to validate that the mobile router owns the at least one mobile network prefix.

15. An apparatus comprising:
a first circuit configured for receiving a route optimization message from one of a mobile router or a correspondent node as part of an attempted route optimization between the mobile router and the correspondent node, the route optimization message specifying a home address of the mobile router and a prefix option field specifying at least one mobile network prefix; and a home agent circuit configured for determining whether the at least one mobile network prefix is owned by the mobile router based on the corresponding home address, the home agent circuit further configured for forwarding the received route optimization message between the mobile router and the correspondent node, based on a destination address field in the route optimization message, if the home agent circuit determines that the at least one mobile network prefix is owned by the mobile router;

wherein the home agent circuit is configured for dropping the route optimization message if the home agent circuit determines that the at least one mobile network prefix is not owned by the mobile router.

16. The apparatus of claim 15, wherein the home agent circuit is configured for determining whether the at least one mobile network prefix is owned by the mobile router in response to detecting a prescribed data structure in the route optimization message that indicates validation of the at least one mobile network prefix is to be performed.

17. The apparatus of claim 15, further comprising a bind cache configured for storing bind cache entries of registered prefixes owned by mobile routers according to the respective home addresses, the home agent circuit configured for detecting whether the at least one mobile network prefix is identified, in one of the bind cache entries, as assigned to the corresponding home address assigned to the mobile router.

18. An apparatus comprising:

a first circuit configured for receiving a home test message from a mobile router via a home agent of the mobile router, the home test message including a source address field specifying a home address of the mobile router and a prefix option field specifying at least one mobile network prefix owned by the mobile router;

a network host circuit configured for generating a reply to the home test message for output to the mobile router via the home agent, the reply including, for each mobile network prefix owned by the mobile router, a corresponding signature generated by the network host circuit based on the corresponding mobile network prefix, an identified home address of the mobile router, and a prescribed secret key maintained by the correspondent node; and a memory circuit configured for storing a routing table entry;

the first circuit configured for receiving a binding update message from the mobile router via the home agent, the binding update message specifying the home address in the corresponding source address field, the at least one mobile network prefix, and a corresponding supplied signature; and the network host circuit configured for selectively adding the routing table entry for each specified mobile network prefix in the binding update message, based on validating the corresponding signature in the binding update message.

19. The apparatus of claim 18, wherein the network host circuit is configured for validating each supplied signature in the binding update message based on determining whether a prescribed correlation exists between the corresponding supplied signature and the corresponding specified mobile network prefix, based on applying the prescribed secret key.

20. The apparatus of claim 19, wherein the prescribed correlation further is based on the home address, the network host circuit configured for determining whether each supplied signature matches the prescribed correlation of the corresponding mobile network prefix with the home address and the prescribed secret key.

21. An apparatus comprising:

means for establishing a tunnel connection with a prescribed home agent; and means for generating a home test message and outputting the home test message via the means for establishing to a correspondent node via the prescribed home agent, the home test message further including a prefix option field specifying at least one mobile network prefix claimed to be owned by the apparatus as a mobile router, for initiation of a reverse routability test between the mobile router and the correspondent node that verifies the mobile router owns the at least one mobile network prefix, wherein:

the means for establishing is configured for receiving, as part of the reverse routability test, a reply addressed to the mobile router from the correspondent node that includes the at least one mobile network prefix and at least one corresponding signature;

the means for generating configured for generating and outputting to the correspondent node a binding update message in response to the reply, the binding update message specifying the at least one mobile network prefix is reachable via a home address used by the mobile router, the binding update message including the corresponding at least one signature specified in the reply.

22. An apparatus comprising:

means for receiving a route optimization message from one of a mobile router or a correspondent node as part of an attempted route optimization between the mobile router and the correspondent node, the route optimization message specifying a home address of the mobile router and a prefix option field specifying at least one mobile network prefix; and means for determining whether the at least one mobile network prefix is owned by the mobile router based on the corresponding home address, the means for determining further configured for forwarding the received route optimization message between the mobile router and the correspondent node, based on a destination address field in the route optimization message, if the means for determining determines that the at least one mobile network prefix is owned by the mobile router;

wherein the means for determining is configured for dropping the route optimization message if the means for determining determines that the at least one mobile network prefix is not owned by the mobile router.

23. An apparatus comprising:

means for receiving a home test message from a mobile router via a home agent of the mobile router, the home test message including a source address field specifying a home address of the mobile router and a prefix option field specifying at least one mobile network prefix owned by the mobile router;

means for generating a reply to the home test message for output to the mobile router via the home agent, the reply including a corresponding signature for each mobile network prefix owned by the mobile router, the corresponding signature generated by means for generating based on the corresponding mobile network prefix, an identified home address of the mobile router, and a prescribed secret key maintained by the correspondent node; and a memory circuit configured for storing a routing table entry;

the means for receiving configured for receiving a binding update message from the mobile router via the home agent, the binding update message specifying the home address in the corresponding source address field, the at least one mobile network prefix, and a corresponding supplied signature; and the means for generating configured for selectively adding the routing table entry for each specified mobile network prefix in the binding update message, based on validating the corresponding signature in the binding update message.

* * * * *